US012784581B2

(12) United States Patent
Ucar et al.

(10) Patent No.: US 12,784,581 B2
(45) Date of Patent: Nov. 3, 2026

(54) MULTIVARIATE HIERARCHICAL ANOMALY DETECTION

(71) Applicant: Toyota Motor Engineering & Manufacturing North America, Inc., Plano, TX (US)

(72) Inventors: Seyhan Ucar, Mountain View, CA (US); Ryan Mercer, Colton, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 824 days.

(21) Appl. No.: 17/328,333

(22) Filed: May 24, 2021

(65) Prior Publication Data

US 2022/0375348 A1 Nov. 24, 2022

(51) Int. Cl.
*G08G 1/01* (2006.01)
*B60W 40/04* (2006.01)
(Continued)

(52) U.S. Cl.
CPC ........... *G08G 1/0133* (2013.01); *B60W 40/04* (2013.01); *G06N 20/00* (2019.01); *G07C 5/008* (2013.01); *G08G 1/0112* (2013.01); *G08G 1/0137* (2013.01); *G08G 1/0141* (2013.01); *G08G 1/161* (2013.01); *G08G 1/22* (2013.01)

(58) Field of Classification Search
None
See application file for complete search history.

(56) References Cited

U.S. PATENT DOCUMENTS 5,696,503 A * 12/1997 Nasburg ................ G06F 18/256 701/119
5,801,943 A * 9/1998 Nasburg ........... G08G 1/096775 340/910

(Continued)

FOREIGN PATENT DOCUMENTS

CN 107331191 A 11/2017
JP 4980396 B2 7/2012
JP 6703613 B2 6/2020

OTHER PUBLICATIONS

V. Chatzigiannakis et al., "Hierarchical Anomaly Detection in Distributed Large-Scale Sensor Networks", 7 pages, Jun. 2006, https://www.researchgate.net/publication/232617212_Hierarchical_Anomaly_Detection_in_Distributed_Large-Scale_Sensor_Networks.

(Continued)

*Primary Examiner* — Christian Chace
*Assistant Examiner* — Scott R Jagolinzer
(74) *Attorney, Agent, or Firm* — DINSMORE & SHOHL LLP

(57) ABSTRACT

A method includes, at a first level manager, receiving vehicle data from a plurality of vehicles, aggregating the vehicle data, determining a first variable associated with the plurality of vehicles based on the aggregated vehicle data, and transmitting the aggregated vehicle data to a second level manager. The second level manager is in a higher hierarchical level than the first level manager. The method further includes, at a second level manager, determining a second variable based on the received aggregated vehicle data, determining whether the first and second variable conform to a predetermined dependency among the variables, and identifying an anomaly based on the determination.

15 Claims, 16 Drawing Sheets

(51) Int. Cl.

| | |
|---|---|
| ***G06N 20/00*** | (2019.01) |
| ***G07C 5/00*** | (2006.01) |
| ***G08G 1/00*** | (2006.01) |
| ***G08G 1/16*** | (2006.01) |

(56) References Cited

U.S. PATENT DOCUMENTS

| | | | | |
|---|---|---|---|---|
| 7,447,588 | B1 * | 11/2008 | Xu | G08G 1/0104 340/995.13 |
| 8,406,770 | B2 | 3/2013 | Smith | |
| 8,948,929 | B2 | 2/2015 | Chun et al. | |
| 8,984,116 | B2 | 3/2015 | Ge et al. | |
| 9,053,636 | B2 * | 6/2015 | Gordon | G08G 1/096775 |
| 9,586,314 | B2 * | 3/2017 | Bruemmer | B25J 9/08 |
| 9,754,226 | B2 * | 9/2017 | Zheng | G08G 1/0112 |
| 10,118,604 | B1 * | 11/2018 | Wrobel | B60W 10/06 |
| 10,284,619 | B2 * | 5/2019 | Li | H04L 63/1416 |
| 10,318,886 | B2 | 6/2019 | Baradaran et al. | |
| 10,347,127 | B2 | 7/2019 | Droz et al. | |
| 10,414,407 | B1 | 9/2019 | Slusar | |
| 10,587,633 | B2 | 3/2020 | Muddu et al. | |
| 10,775,179 | B1 | 9/2020 | Hayward | |
| 11,671,436 | B1 * | 6/2023 | Xu | G06F 18/24 726/22 |
| 2016/0284212 | A1 * | 9/2016 | Tatourian | G08G 1/096775 |
| 2018/0022348 | A1 * | 1/2018 | Chu | G06V 20/588 701/23 |
| 2018/0023965 | A1 * | 1/2018 | Misawa | G01C 21/367 701/495 |
| 2018/0218596 | A1 * | 8/2018 | Castelli | H04L 67/52 |
| 2019/0038204 | A1 | 2/2019 | Beck et al. | |
| 2019/0135283 | A1 * | 5/2019 | Bonk | G08G 1/096844 |
| 2020/0072621 | A1 * | 3/2020 | Lee | G06F 16/29 |
| 2020/0090503 | A1 * | 3/2020 | Rolf | G08G 1/0116 |
| 2020/0320873 | A1 * | 10/2020 | Du | G08G 1/052 |
| 2021/0081559 | A1 * | 3/2021 | Gratton | G06F 21/604 |
| 2021/0134149 | A1 * | 5/2021 | Mubarek | G08G 1/052 |
| 2021/0192586 | A1 * | 6/2021 | Gomez | G08G 1/0129 |
| 2021/0366279 | A1 * | 11/2021 | Su | G08G 1/096783 |

OTHER PUBLICATIONS

V. Kaltsa et al., “Multiple Hierarchical Dirichlet Processes for Anomaly Detection in Traffic”, 3 pages, Apr. 2018, vol. 169, https://www.sciencedirect.com/science/article/abs/pii/S1077314218300110.

* cited by examiner

700

MULTIVARIATE HIERARCHICAL ANOMALY DETECTION

TECHNICAL FIELD

The present specification relates to a traffic management system, and more particularly, to multivariate hierarchical anomaly detection.

BACKGROUND

Traffic anomalies are driving actions, events, or situations that occur at an unusual location and/or an unusual time. Anomalies can adversely affect driving conditions and degrade driving performance. Anomalies can be either extrinsic anomalies or intrinsic anomalies.

Extrinsic anomalies may be environmental anomalies. That is, extrinsic anomalies may be anomalies created by road or environmental conditions, such as potholes, lane closures, irregular road surfaces, inclement weather, and the like. Intrinsic anomalies may be driving anomalies. That is, intrinsic anomalies may be anomalies created by driving behavior, such as aggressive driving, drunk driving, distracted driving, and the like. Both intrinsic and extrinsic anomalies may cause traffic accidents. As such, it may be desirable to detect anomalies and warn nearby drivers about detected anomalies so that these drivers may take the necessary precautions.

In prior art examples, anomalies may be detected by observing the behavior of individual drivers and determining whether an individual driver exhibits unusual driving behavior. However, individual driver behavior may be misleading. For example, in some situations, a driver tailgating other drivers may indicated an aggressive driver. However, in high density traffic situations, many drivers may be tailgating other drivers because traffic is moving so slowly. In another example, a driver honking a horn may be considered an aggressive driver. However, in certain environments, drivers may utilize their horns to facilitate safe driving. In other examples, one driver exhibiting aggressive driving may cause other drivers to engage in unusual driving behavior as well. Accordingly, there is a need for improved methods and systems to detect driving anomalies.

SUMMARY

In one embodiment, a method may include, at a first level manager, receiving vehicle data from a plurality of vehicles, aggregating the vehicle data, determining a first variable associated with the plurality of vehicles based on the aggregated vehicle data, and transmitting the aggregated vehicle data to a second level manager. The second level manager may be in a higher hierarchical level than the first level manager. The method may further include, at a second level manager, determining a second variable based on the received aggregated vehicle data, determining whether the first and second variables conform to a predetermined dependency among the variables, and identifying an anomaly based on the determination.

In another embodiment, a method may include receiving first vehicle data from a plurality of vehicles at a first time, determining a first variable and a second variable associated with each of the plurality of vehicles at the first time based on the first vehicle data, receiving second vehicle data from the plurality of vehicles at a second time, determining the first variable and the second variable associated with each of the plurality of vehicles at the second time based on the second vehicle data, determining whether the first variable at the first time, the second variable at the first time, the first variable at the second time, and the second variable at the second time conform to a predetermined dependency among the variables, and identifying an anomaly based on the determination.

In another embodiment, a system may include a plurality of first level managers and at least one second level manager. Each first level manager may be associated with a certain geographic area. The second level manager may be in a higher hierarchical level than the plurality of first level managers and may be associated with one or more of the first level managers. Each of the plurality of first level managers may be configured to receive vehicle data from a plurality of vehicles, aggregate the vehicle data received from the plurality of vehicles to determine first level data, determine a first variable associated with the plurality of vehicles based on the first level data, and transmit the first level data and the first variable to the at least one second level manager. The second level manager may be configured to aggregate the first level data received from the one or more of the plurality of first level managers to determine second level data, determine a second variable associated with the plurality of vehicles based on the second level data, determine whether the first variable and the second variable conform to a predetermined dependency among the variables, and identify an anomaly based on the determination.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
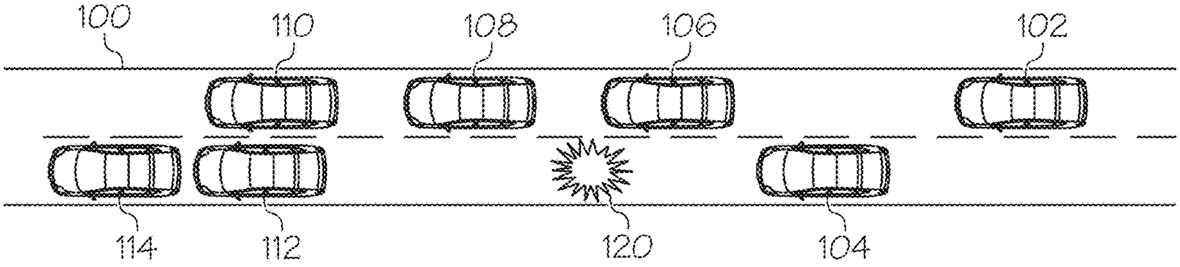
FIG. 1 depicts example intrinsic and extrinsic anomalies, according to one or more embodiments shown and described herein.

The embodiments disclosed herein include a traffic management system for multivariate hierarchical anomaly detection. A large geographic area may be divided into a plurality of smaller geographic areas. Each of those geographic areas may be further divided into even smaller geographic areas, thereby creating a hierarchical structure.

The lowest level of the hierarchical structure may be a vehicle layer, which comprises individual connected vehicles. Each connected vehicle may gather sensor data comprising speeds, accelerations, trajectories, and other data about individual vehicles. Each connected vehicle may then transmit the collected sensor data to the next hierarchical level, which may be a section level. The section level may comprise a plurality of section managers, wherein each section manager receives sensor data from connected vehicles within a certain geographic area.

After receiving sensor data from a plurality of vehicles, a section manager may aggregate the received sensor data and may apply learning techniques to infer any dependencies with the vehicle layer. The section manager may also retrieve predefined dependency rules.

The section manager may then determine whether there is any discord between the aggregated data and any predefined or learned dependency rules. The section manager may determine if there is any discord among vertical dependencies (e.g., dependencies between variables at different hierarchical levels) or among horizontal dependencies (e.g., dependencies between variables at different times at the same hierarchical level). If any discord is detected, this may indicate that an anomaly has is present, as disclosed in further detail herein. The section manager may then inform lower and/or higher hierarchical levels of the discord detected. In addition, each section manager may transmit its aggregated data to a higher hierarchical level, which may be a locality level.

The locality level may comprise a plurality of locality managers, wherein each locality manager receives data from one or more section managers. After receiving data from one or more section managers, a locality manager may aggregate the received data. The locality manager may then look for discord between the aggregated data and any locality dependency rules, in a similar manner as the section managers, but at a higher hierarchical level.

Each locality manager may transmit aggregated data to a higher hierarchical level, which may be a city level, which may comprise a city level. The city level may comprise a plurality of city managers, wherein each city manager receives data from one or more locality managers. A city manager may perform similar operations as the section managers and the locality managers, but at a higher hierarchical level.

Whenever a particular manager at one hierarchical level detects an anomaly, the manager may transmit an indication to the lower level manager for which the anomaly was detected. That lower level manager may then determine which lower level the anomaly is contained in. For example, if a city manager detects an anomaly within a particularly locality, the city manager may transmit an indication to the locality manager for that locality that an anomaly has been detected. That locality manager may then determine which section the anomaly is in and may transmit an indication to the section manager for that section that an anomaly has been detected. The section manager may then determine which vehicle is causing the anomaly (if the anomaly is an intrinsic anomaly). Then, the appropriate manager at each layer may transmit data or driving instructions to connected vehicles instructing the connected vehicles to avoid or otherwise mitigate the effects of the anomaly. Accordingly, overall traffic flow may be improved.

Turning now to the figures, FIG. 1 shows a plurality of vehicles 102, 104, 106, 108, 110, 112, and 114 driving along a road 100. In the example of FIG. 1, a pothole 120 is present in one of the lanes of the road 100. The pothole 120 is an example of an extrinsic anomaly. In addition, the vehicle 112 is tailgating the vehicle 114, which is an example of an intrinsic anomaly. Both intrinsic and extrinsic anomalies may reduce traffic flow and create a dangerous driving environment. Accordingly, disclosed herein are systems and methods for detecting such anomalies.

In the example of FIG. 1, one or more of the vehicles 102, 104, 106, 108, 110, 112, 114 may be connected vehicles. A connected vehicle is able to communicate remotely with systems outside of the vehicle (e.g., a traffic management system or other vehicles). In particular, a connected vehicle may communicate with a traffic management system.

A connected vehicle may collect a variety of data from sensors and other on-board equipment. This data may include information about the state of the vehicle (e.g., speed, trajectory, and the like). The connected vehicle may also collect data external to the vehicle. For example, vehicle sensors may determine positions, speeds, and trajectories of other vehicles on the road. Vehicle sensors may also collect data about weather, road conditions, or other factors.

Autonomous vehicles may use data collected by vehicle sensors to perform autonomous driving. However, connected vehicles (either autonomous or human-driven) may also transmit collected data to a traffic management system or other external computing device. A traffic management system may receive data from a plurality of connected vehicles. Thus, the traffic management system may determine an overall traffic state on a particular road or within a particular geographic area based on data received from multiple connected vehicles.

A traffic management system may also transmit driving instructions to connected vehicles. For example, if the traffic management system detects an anomaly along a particular road, the traffic management system may instruct connected vehicles to avoid that particular road, thereby increasing overall traffic flow.

Figure 2:
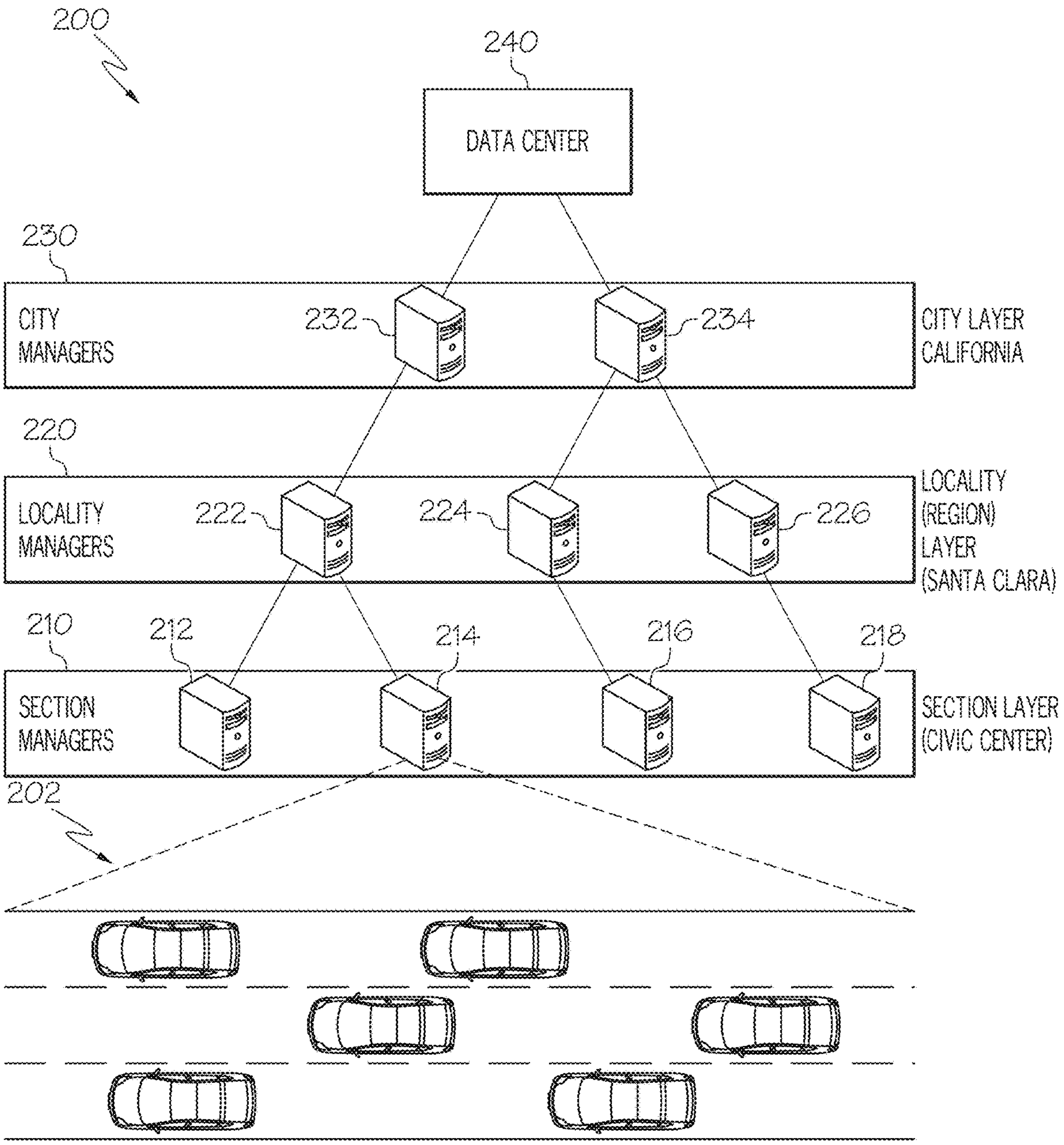
FIG. 2 schematically depicts an example hierarchical traffic management system for anomaly detection, according to one or more embodiments shown and described herein.

FIG. 2 schematically depicts a hierarchical traffic management system 200 for multivariate hierarchical anomaly detection, according to one or more embodiments shown and described herein. In embodiments, the system 200 comprises multiple levels or layers of managers. For example, as shown in FIG. 2, the system 200 comprises a section layer 210, a locality layer 220, and a city layer 230. In addition, the system 200 also includes a vehicle layer 202 and a data center 240. In some examples, the system 200 may comprise more or less layers than that shown in FIG. 2.

The vehicle layer 202 comprises a plurality of vehicles. At least some of the vehicles of the vehicle layer 202 may be connected vehicles. The connected vehicles of the vehicle layer 202 may gather sensor data and transmit the data to a section manager, as explained in further detail below. The gathered sensor data may be data about the vehicle collecting the data (e.g., based on internal vehicle sensors), or data about other vehicles on the road (e.g., based on external vehicle sensors). As vehicles drive along one or more roads, the vehicles may pass through different geographic areas that may be covered by different section managers. That is, each section manager may cover a different geographic area. Accordingly, as a connected vehicle drives along a road, the vehicle may gather sensor data and transmit the data to the section manager that covers the road or geographic area in which the vehicle is traveling (e.g., the closest section manager). Additional details regarding the vehicle layer 202 are discussed in further detail below with respect to FIG. 3.

The section layer 210 may include a plurality of section managers, for example, section managers 212, 214, 216, and 218. While the example of FIG. 2 shows the section layer 210 including four section managers, it should be understood that in other examples, the section layer 210 may include any number of section managers. As discussed above, each section manager of the section layer 210 may cover a different geographic area. That is, each section manager may receive vehicle data from one or more vehicles located in a particular geographic area. In the example of FIG. 2, the section managers 212, 214, 216, and 218 cover different areas around a civic center.

The section managers of the section layer 210 may be edge computing devices or edge servers, such as road side units. In one example, each section manager may be an edge server located near a road travel by vehicles of the vehicle layer 202. In one example, one or more section managers of the section layer 210 may be hosted by a cloud server in a remote data center. After receiving vehicle data from one or more vehicles of the vehicle layer 202, a section manager may aggregate the received vehicle data and may transmit the aggregated data to a locality manager in the locality layer 220, as described in further detail below. The section manager may also perform additional functionality described in further detail below with respect to FIG. 4.

The locality layer 220 may include a plurality of locality managers, for example, locality managers 222, 224, and 226. While the example of FIG. 2 shows the locality layer 220 including three locality managers, it should be understood that in other examples, the locality layer 220 may include any number of locality managers. Each locality manager of the locality layer 220 may cover a different geographic area. That is, each locality manager may receive section data from one or more section managers of the section layer 210. In the example of FIG. 2, the locality manager 222 receives section data from section managers 212 and 214, the locality manager 224 receives section data from the section manager 216, and the locality manager 226 receives section data from the section manager 218. In the example of FIG. 2, each locality manager of the locality layer 220 covers a different portion of Santa Clara.

The locality managers of the locality layer 220 may be edge computing devices, cloud-based computing devices, or other types of computing devices. After receiving section data from one or more section managers of the section layer 210, a locality manager may aggregate the received section data and may transmit the aggregated section data to a city manager in the city layer 230, as described in further detail below. The locality manager may also perform additional functionality described in further detail below with respect to FIG. 4.

The city layer 230 may include a plurality of city managers, for example, city managers 232 and 234. While the example of FIG. 2 shows the city layer 230 including two city managers, it should be understood that in other examples, the city layer 230 may include any number of city managers. Each city manager of the city layer 230 may cover a different geographic area. That is, each city manager may receive locality data from one or more locality managers of the locality layer 220. In the example of FIG. 2, the city manager 232 receives locality data from the locality manager 222 and the city manager 234 receives locality data from the locality managers 224 and 226. In the example of FIG. 2, each city manager of the city layer 230 covers a different city in California.

The city managers of the city layer 230 may be edge computing devices, cloud-based computing devices, or other types of computing devices. After receiving locality data from one or more locality managers of the locality layer 220, a locality manager may aggregate the received locality data and may transmit the aggregated locality data to a the data center 240, as described in further detail below. The city manager may also perform additional functionality described in further detail below with respect to FIG. 5.

Figure 3:
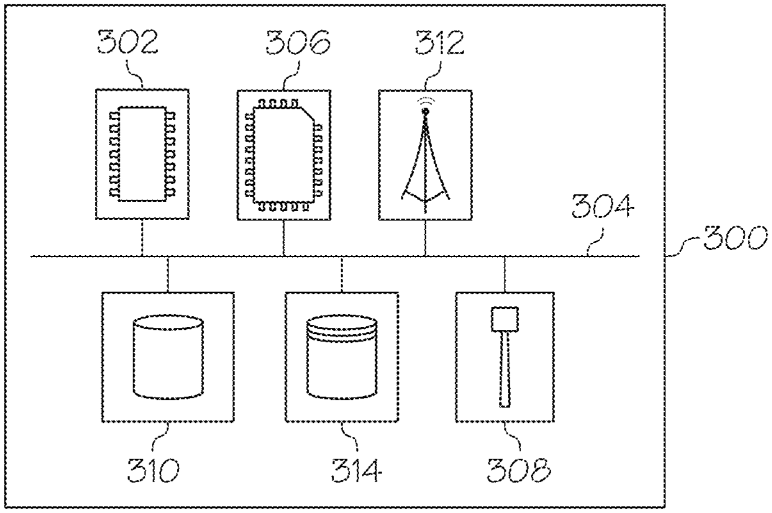
FIG. 3 schematically depicts an example vehicle system, according to one or more embodiments shown and described herein.

FIG. 3 depicts a vehicle system 300 that may be included in the connected vehicles in the vehicle layer 202 of FIG. 2. The vehicle system 300 includes one or more processors 302, a communication path 304, one or more memory modules 306, a satellite antenna 308, one or more vehicle sensors 310, a network interface hardware 312, and a data storage component 314, the details of which will be set forth in the following paragraphs. The vehicle system 300 may be included in a human driven connected vehicle and in an autonomous connected vehicle.

Each of the one or more processors 302 may be any device capable of executing machine readable and executable instructions. Accordingly, each of the one or more processors 302 may be a controller, an integrated circuit, a microchip, a computer, or any other computing device. The one or more processors 302 are coupled to a communication path 304 that provides signal interconnectivity between various modules of the system. Accordingly, the communication path 304 may communicatively couple any number of processors 302 with one another, and allow the modules coupled to the communication path 304 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 304 may be formed from any medium that is capable of transmitting a signal such as, for example, conductive wires, conductive traces, optical waveguides, or the like. In some embodiments, the communication path 304 may facilitate the transmission of wireless signals, such as WiFi, Bluetooth®, Near Field Communication (NFC) and the like. Moreover, the communication path 304 may be formed from a combination of mediums capable of transmitting signals. In one embodiment, the communication path 304 comprises a combination of conductive traces, conductive wires, connectors, and buses that cooperate to permit the transmission of electrical data signals to components such as processors, memories, sensors, input devices, output devices, and communication devices. Accordingly, the communication path 304 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 300 includes one or more memory modules 306 coupled to the communication path 304. The one or more memory modules 306 may comprise RAM, ROM, flash memories, hard drives, or any device capable of storing machine readable and executable instructions such that the machine readable and executable instructions can be accessed by the one or more processors 302. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 306. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some examples, the one or more memory modules 306 may include a vehicle level anomaly detection module, as disclosed in further detail below.

Referring still to FIG. 3, the vehicle system 300 comprises a satellite antenna 308 coupled to the communication path 304 such that the communication path 304 communicatively couples the satellite antenna 308 to other modules of the vehicle system 300. The satellite antenna 308 is configured to receive signals from global positioning system satellites. Specifically, in one embodiment, the satellite antenna 308 includes one or more conductive elements that interact with electromagnetic signals transmitted by global positioning system satellites. The received signal is transformed into a data signal indicative of the location (e.g., latitude and longitude) of the satellite antenna 308, and consequently, the vehicle containing the vehicle system 300.

The vehicle system 300 comprises one or more vehicle sensors 310. Each of the one or more vehicle sensors 310 is coupled to the communication path 304 and communicatively coupled to the one or more processors 302. The one or more sensors 310 may include, but are not limited to, LiDAR sensors, RADAR sensors, optical sensors (e.g., cameras, laser sensors, proximity sensors, location sensors (e.g., GPS modules)), and the like. In embodiments, the sensors 310 may monitor the surroundings of the vehicle and may detect other vehicles on the road. In particular, the sensors 310 may determine locations and/or speeds of other vehicles (which may be connected vehicles and/or non-connected vehicles).

For autonomous vehicles, the vehicle system 300 may include an autonomous driving module and the data gathered by the sensors 310 may be used by the autonomous driving module to autonomously navigate the vehicle.

Still referring to FIG. 3, the vehicle system 300 comprises network interface hardware 312 for communicatively coupling the vehicle system 300 to the traffic management system 200 and/or another vehicle system via vehicle-to-everything (V2X) communication or vehicle-to-vehicle (V2V) communication. The network interface hardware 312 can be communicatively coupled to the communication path 304 and can be any device capable of transmitting and/or receiving data via a network. Accordingly, the network interface hardware 312 can include a communication transceiver for sending and/or receiving any wired or wireless communication. For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 312 includes hardware configured to operate in accordance with the Bluetooth® wireless communication protocol. In embodiments, the network interface hardware 312 of the vehicle system 300 may transmit sensor data gathered by the sensors 310 to a section manager of the section layer 210 of the traffic management system 200 of FIG. 2.

Still referring to FIG. 3, the vehicle system 300 comprises a data storage component 314. The data storage component 314 may store data used by various components of the vehicle system 300. In addition, the data storage component 314 may store data gathered by the sensors 310. The data storage component 314 may also store a vehicle level dependency database, as described in further detail below.

The vehicle system 300 may also include an interface. The interface may allow for data to be presented to a human driver and for data or other information to be input by the driver. For example, the interface may include a screen to display information to a driver, speakers to present audio information to the driver, and a touch screen that may be used by the driver to input information. In other examples, the vehicle system 300 may include other types of interfaces.

In some embodiments, the vehicle system 300 may be communicatively coupled to one or more section managers of the section layer 210 of the traffic management system 200 by a network. In one embodiment, the network may include one or more computer networks (e.g., a personal area network, a local area network, or a wide area network), cellular networks, satellite networks and/or a global positioning system and combinations thereof. Accordingly, the vehicle system 300 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig- Bee, and/or other near field communication protocols. Suitable cellular networks include, but are not limited to, technologies such as LTE, WiMAX, UMTS, CDMA, and GSM.

Figure 4:
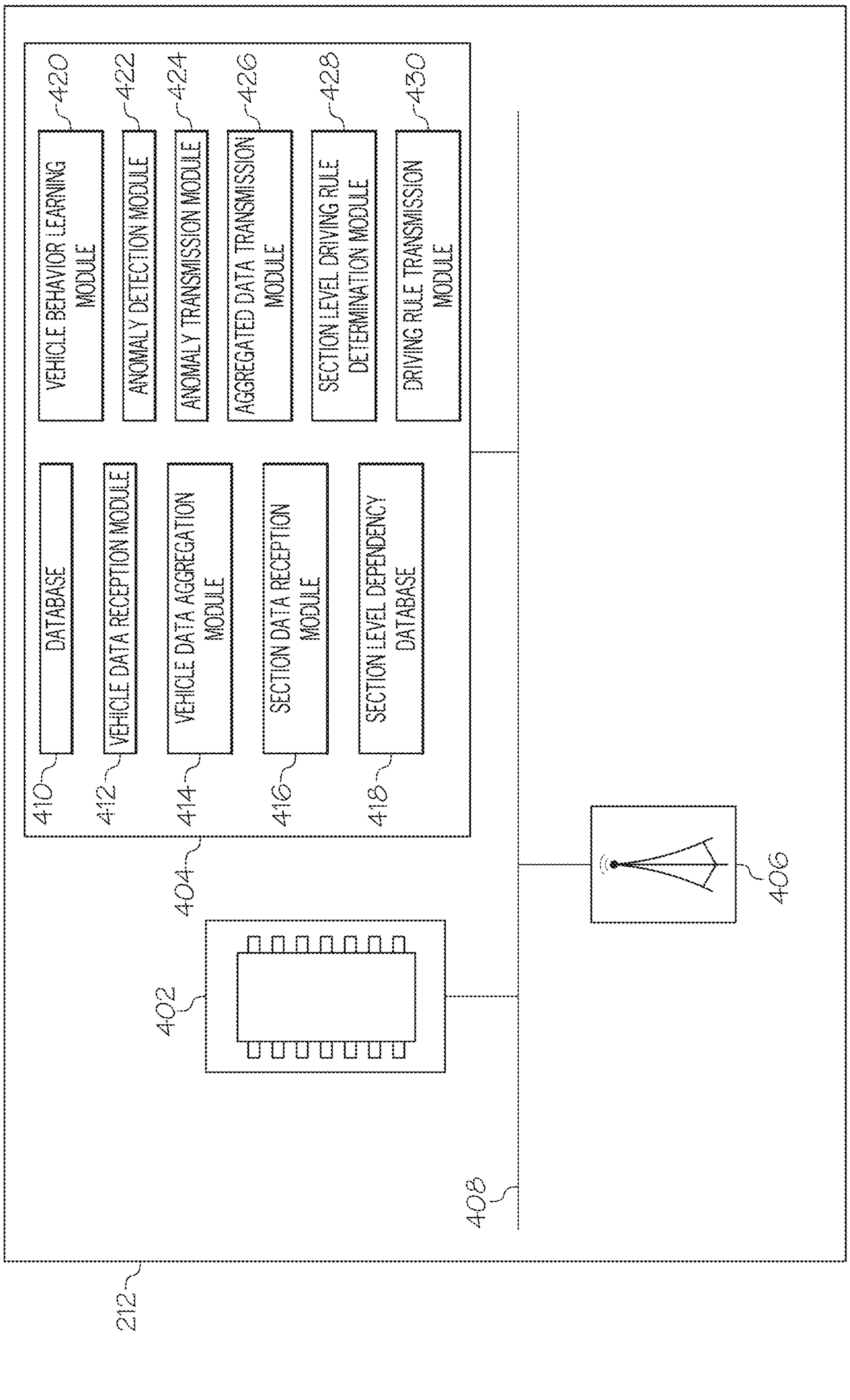
FIG. 4 schematically depicts an example section manager, according to one or more embodiments shown and described herein.

Referring now to FIG. 4, the section manager 212 of the section layer 210 of FIG. 2 is shown. While FIG. 4 specifically illustrates the section manager 212, it should be understood that any section manager of the section layer 210 may be similarly constructed.

The section manager 212 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402. The communication path 408 provides signal interconnectivity between various modules of the section manager 212.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the section manager 212 may transmit and receive data to and from one or more vehicles of the vehicle layer 202 of FIG. 2. The network interface hardware 406 of the section manager 212 may also transmit data to a locality manager of the locality layer 220, as disclosed herein.

The one or more memory modules 404 include a database 410, a vehicle data reception module 412, a vehicle data aggregation module 414, a section data reception module 416, a section level dependency database 418, a vehicle behavior learning module 420, an anomaly detection module 422, an anomaly transmission module 424, an aggregated data transmission module 426, a section level driving rule determination module 428, and a driving rule transmission module 430. Each of the database 410, the vehicle data reception module 412, the vehicle data aggregation module 414, the section data reception module 416, the section level dependency database 418, the vehicle behavior learning module 420, the anomaly detection module 422, the anomaly transmission module 424, the aggregated data transmission module 426, the section level driving rule determination module 428, and the driving rule transmission module 430 may be a program module in the form of operating systems, application program modules, and other program modules stored in one or more memory modules 404. In some embodiments, the program module may be stored in a remote storage device that may communicate with the section manager 212. Such a program module may include, but is not limited to, routines, subroutines, programs, objects, components, data structures and the like for performing specific tasks or executing specific data types as will be described below.

The database 410 may temporarily store data received from one or more vehicles of the vehicle layer 202 or data received from a locality manager of the locality layer 220. The data received from the one or more vehicles may include sensor data, as described above. The data received from a locality manager of the locality layer 220 may include indications that an anomaly has been detected, as disclosed in further detail below.

Referring still to FIG. 4, the vehicle data reception module 412 may receive vehicle data (e.g., sensor data) from one or more vehicles of the vehicle layer 202. The vehicle data reception module 412 may receive vehicle data from vehicles within a certain geographic area covered by the section manager 212, as discussed above. The received vehicle data may include sensor data captured by one or more connected vehicles indicating information about vehicles traveling along a road. For example, the vehicle data may include speeds, accelerations, and trajectories of vehicles. In other examples, the vehicle data may include other information about vehicles.

The vehicle data aggregation module 414 may aggregate vehicle data received from multiple vehicles. While each individual vehicle of the vehicle layer 202 may only gather vehicle data about certain vehicles (e.g., nearby vehicles), by aggregating vehicle data from multiple vehicles in a particular section, the section manager 212 may obtain a more comprehensive picture of the vehicle activity within the section. In particular, the vehicle data aggregation module 414 may aggregate received vehicle data to determine section data.

The vehicle data aggregation module 414 may aggregate vehicle data to determine section data that no individual vehicle would be able to determine. In particular, the vehicle data aggregation module 414 may aggregate received vehicle data to determine one or more variables based on the received vehicle data. For example, the vehicle data aggregation module 414 may aggregate speeds of multiple vehicles to determine an average vehicle speed in a section. In addition, the vehicle data aggregation module 414 may aggregate trajectories of multiple vehicles to determine trajectories of every vehicle in a section. In other examples, the vehicle data aggregation module 414 may aggregate other received vehicle data.

The section data reception module 416 may receive section data from other section managers of the section layer 210. In particular, the section data reception module 416 may receive section data from a section manager that covers a geographic area adjacent to the geographic area covered by the section manager 212. In the example of FIG. 2, the section data reception module 416 of the section manager 212 may receive section data from the section manager 214. As such, the section manager 214 may determine section data at a first time and transmit this section data to the section manager 212. The section manager 212 may then determine section data at a second time and may compare the section data determined at the first and second times to identify anomalies based on horizontal dependencies, as explained in further detail below.

The section level dependency database 418 may store section level dependencies, as disclosed herein. Dependencies may describe relationships between variables that are expected in driving situations in which no anomaly is present. Such variables may comprise data collected by vehicles of the vehicle layer 202, data aggregated by the section manager 212, data aggregated by other section managers (e.g., the section manager 214), or data aggregated at another hierarchical level, such as the locality manager 222.

The section level dependency database 418 may store vertical dependencies and/or horizontal dependencies. Vertical dependencies may describe expected relationships between variables at different hierarchical levels (e.g., a first variable determined by the section manager 212 and a second variable determined by the locality manager 222). Horizontal dependencies may describe expected relationships between variables at the same hierarchical level (e.g., a first variable determined by the section manager 212 and a second variable determined by the section manager 214).

In some examples, the dependencies in the section level dependency database 418 may be predefined by traffic engineers or other knowledgeable individuals or organizations. In other examples, one or more dependencies in the section level dependency database 418 may be learned by the vehicle behavior learning module 420, as described in further detail below.

When an anomaly is present in a driving situation, certain driving behavior may change in response to the anomaly. However, simply looking at the driving behavior of individual vehicles may not be sufficient to detect anomalies. For example, tailgating may be a behavior of an aggressive driver that comprises an intrinsic anomaly. However, as discussed above, in a slow-moving, high density traffic situation, many drivers may tailgate other drivers simply because traffic is moving slowly enough that it is safe to do so. As such, simply looking at tailgating behavior of one or more vehicles may not be indicative of an anomaly.

Figure 7:
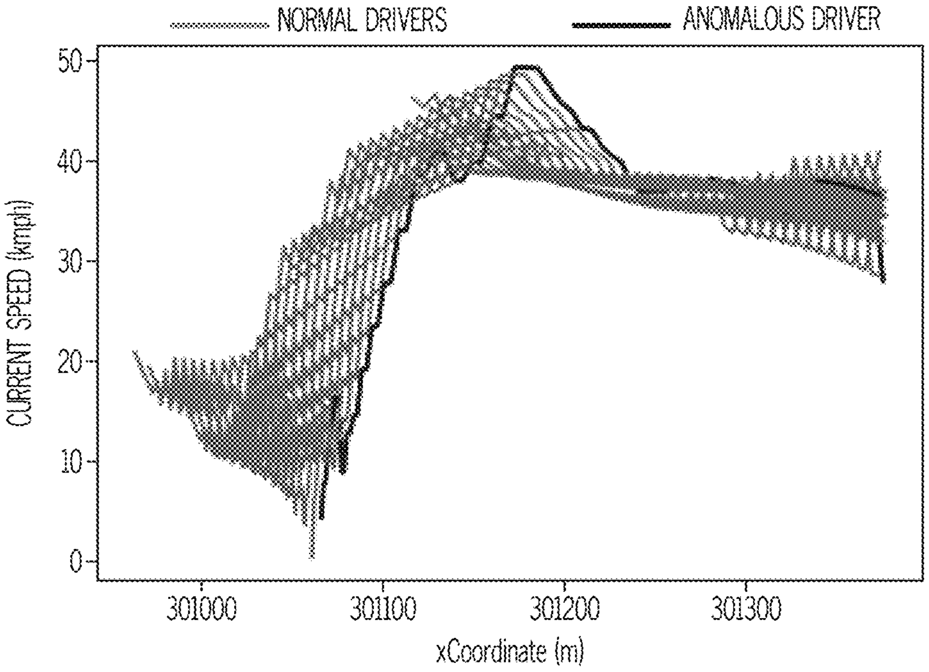
FIG. 7 depicts a plot of example vehicle trajectories, according to one or more embodiments shown and described herein.

Furthermore, looking for anomalous driving behavior of one vehicle as compared to other vehicles may also fail to detect an anomaly. In some examples, this may be due to anomalous driving behavior being propagated from one driver to other drivers. For example, FIG. 7 shows a plot 700 of speed vs. position for several drivers. In the example of FIG. 7, one anomalous driver is driving erratically by continually changing speed. This causes other nearby drivers to adjust their speeds as well in order to avoid colliding with the anomalous driver. Thus, the speed of each of the vehicles relative to each other is relatively constant. However, there is still an anomaly present, despite the vehicles all travelling at about the same speeds over time, relative to each other.

In order to overcome the above problems with detecting anomalies, the traffic management system 200 looks at dependencies between variables, which may be stored in one or more dependency databases, as disclosed herein. Each layer of the traffic management system 200 may look at different dependencies, based on the type of data observable at each layer. In addition, different managers within a layer (e.g., different section managers or different locality managers) may have look at different dependencies based on the character of the geographic region covered by a certain manager.

Referring back to FIG. 4, the section level dependency database 418 may store section level dependencies. As described above, the section level dependency database 418 may initially be populated with section-level dependencies predetermined by a traffic engineer. The section-level dependencies may include expected relationships between variables when no anomalies are present. For example, in a normal driving situation, if traffic density in a particular location is low, average vehicle speed in the location is expected to be high. This is because low traffic density generally allows vehicles to drive relatively faster. When traffic density is low but average vehicle speed is also low, this may indicate an anomaly.

Accordingly, a dependency may be stored in the section level dependency database 418 that when traffic density is low, average vehicle speed should be low. The section level dependency database 418 may store more specific features of what constitutes a low traffic density and a low average vehicle speed. For example, the section level dependency database 418 may store dependencies indicating particular levels of traffic density that are expected to occur along with particular average vehicle speeds.

Another dependency may be that if average vehicle speed in a location is stable, traffic flow should remain stable. However, when an aggressive driver is present, other vehicles may move away from the aggressive driver, thereby reducing traffic flow while maintaining a stable average speed. Thus, a violation of this dependency may indicate the presence of an anomaly. As such, this is another dependency that may be stored in the section level dependency database 418.

The section level dependency database 418 may store dependencies based on variables that are accessible to the section manager 212 (e.g., data aggregated by the vehicle data aggregation module 414). For example, the section level dependency database 418 may store dependencies associated with average vehicle speeds, average vehicle accelerations, vehicle trajectories, and the like. In some examples, different section managers of the section layer 210 may store different dependencies based on the geographic area the each section manager covers. For example, the section manager 212 and the section manager 214 may each cover a geographic area having a different road profile, and thus, different dependencies between variables.

In some examples, the section level dependency database 418 may store vertical dependencies between variables determined at different hierarchical levels. In other examples, the section level dependency database 418 may store horizontal dependencies between variables determined at different section managers (e.g., dependencies between variables determined by different section managers of the section layer 210).

Referring still to FIG. 4, the vehicle behavior learning module 420 may learn vehicle behavior based on the vehicle data received by the vehicle data reception module 412. For example, the vehicle behavior learning module 420 may use machine learning techniques to learn dependencies between variables based on data received by the vehicle data reception module 412 over time. For example, the vehicle behavior learning module 420 may learn that certain variables are typically associated with each other in a certain manner based on vehicle data received over a certain period of time. The vehicle behavior learning module 420 may then add these learned dependencies to the section level dependency database 418.

The anomaly detection module 422 may detect anomalies using the techniques described herein. In embodiments, the anomaly detection module 422 may compare data aggregated by the vehicle data aggregation module 414 to certain other data and may determine if there is any discord with dependencies stored in the section level dependency database 418. As discussed above, the dependencies stored in the section level dependency database 418 indicate expected dependencies between variables when there is no anomaly. Accordingly, if there is a discord between received data and one or more expected dependencies (e.g., the harmony of an expected dependency is violated), the anomaly detection module 422 may determine that an anomaly is present. The anomaly detection module 422 may determine whether there is discord with vertical dependencies and/or horizontal dependencies.

When looking at vertical dependencies, the anomaly detection module 422 may detect anomalies by comparing data gathered at different hierarchical levels. In embodiments, managers at each hierarchical level of the traffic management system 200 may receive and aggregate data from a lower hierarchical level. Accordingly, managers at different hierarchical levels may obtain data associated with different variables. For example, a manager in one hierarchical level may determine average vehicle speed, whereas a manager in a higher hierarchical level may determine traffic density. However, each variable determined at each hierarchical level is taken at the same time steps. Accordingly, the anomaly detection module 422 may perform time series analysis to detect discord between vertical dependencies associated with data at different hierarchical levels.

In one example, the section level dependency database 418 may store a dependency indicating that a low traffic density is expected to correspond with high average vehicle speed, as discussed above. Accordingly, if the anomaly detection module 422 observes that in a particular location within the section managed by the section manager 212, there is a low traffic density but also a low average vehicle speed, the anomaly detection module 422 may determine that an anomaly is present.

When looking at horizontal dependencies, the anomaly detection module 422 may detect anomalies by comparing data associated with the same variable at different times. In some examples, this may comprise comparing data aggregated by the vehicle data aggregation module 414 at two different times. In other examples, this may comprise comparing data aggregated by the vehicle data aggregation module 414 to data received by the section data reception module 416 (which may comprise data captured at an earlier time than the data aggregated by the vehicle data aggregation module 414). For example, a horizontal dependency may indicate that if average vehicle speed remains relatively constant over time, then traffic flow should also remain relatively constant over time. Thus, if traffic flow decreases over time while average vehicle speed remains constant, the anomaly detection module 422 may determine that an anomaly is present.

The anomaly transmission module 424 may transmit information about an anomaly detected by the anomaly detection module 422 to a higher hierarchical level (e.g., to the locality manager 222 of the locality layer 220) and/or to a lower hierarchical level (e.g., to the connected vehicles in the vehicle layer 202). When these higher or lower hierarchical levels receive information about a detected anomaly, they may take steps to minimize the effect of the anomaly, as disclosed in further detail below.

The aggregated data transmission module 426 may transmit the vehicle data aggregated by the vehicle data aggregation module 414 to a locality manager of the locality layer 220 (e.g., to the locality manager 222). The locality manager may receive the data from the aggregated data transmission module 426 and process the data as discussed in further detail below.

The section level driving rule determination module 428 may receive information about an anomaly detected by a higher hierarchical level (e.g., from the locality manager 222) and may determine a section level rule to mitigate the effect of the anomaly. For example, the section level driving rule determination module 428 may receive information that an anomaly is located along a particular road in the section managed by the section manager 212. The section level driving rule determination module 428 may then determine a section level rule that vehicles should avoid that particular road, thereby mitigating the effect of the anomaly.

The driving rule transmission module 430 may transmit a driving rule determined by the section level driving rule determination module 428 to the connected vehicles of the vehicle layer 202 within the section. For example, if the section level driving rule determination module 428 determines that vehicles should avoid a particular road containing an anomaly, the driving rule transmission module 430 may transmit this rule to the connected vehicles of the vehicle layer 202 within the section. The connected vehicles may receive this rule and may then avoid the road containing the anomaly.

Figure 5:
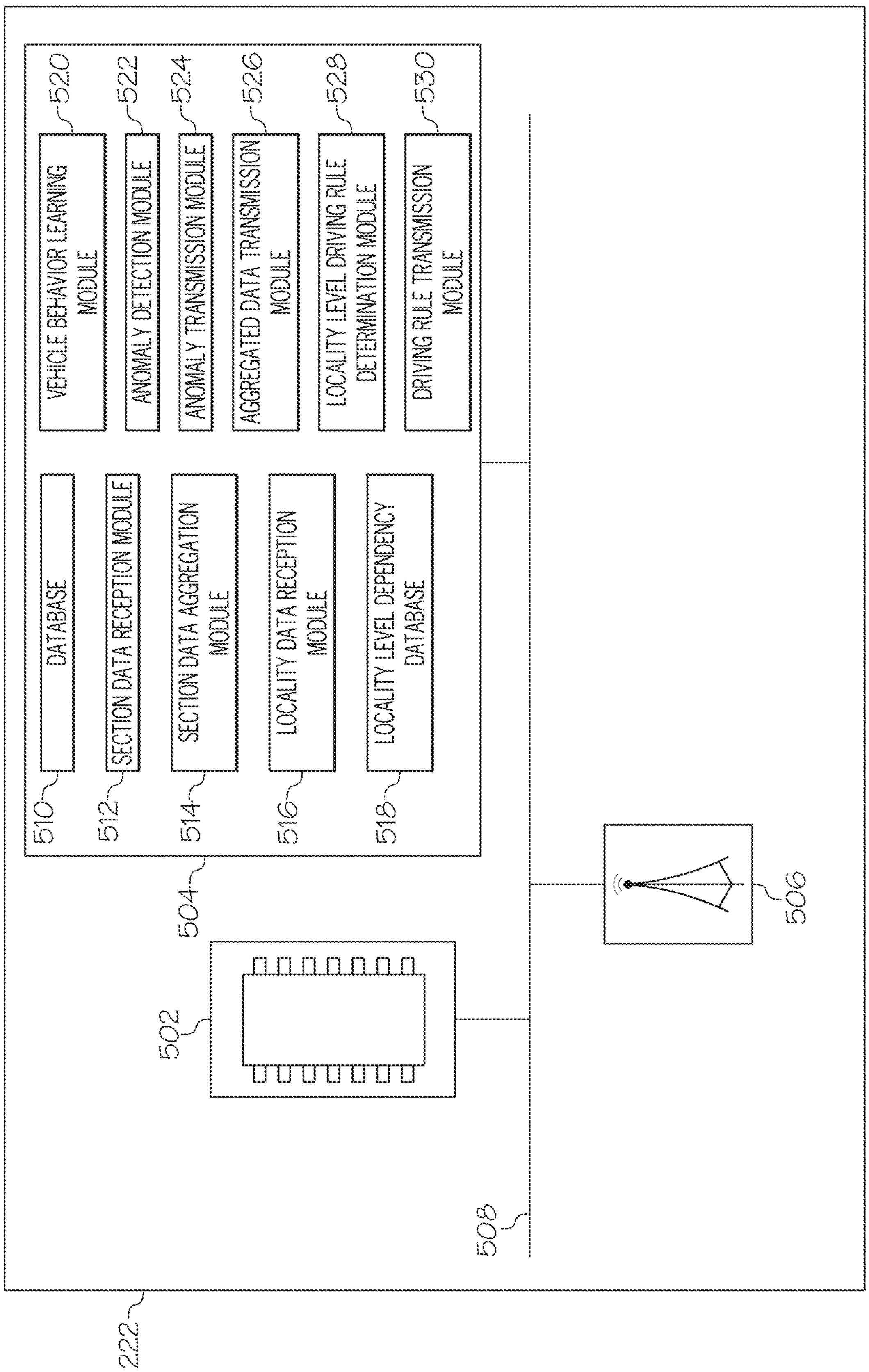
FIG. 5 schematically depicts an example locality manager, according to one or more embodiments shown and described herein.

Referring now to FIG. 5, the locality manager 222 of the locality layer 220 of FIG. 2 is shown. While FIG. 5 specifically illustrates the locality manager 222, it should be understood that any locality manager of the locality layer 220 may be similarly constructed.

The locality manager 222 comprises one or more processors 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502. The communication path 508 provides signal interconnectivity between various modules of the locality manager 222.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 506 includes hardware configured to operate in accordance with the Bluetooth® wireless communication protocol. The network interface hardware 506 of the locality manager 222 may transmit and receive data to and from one or more section managers of the section layer 210 of FIG. 2. The network interface hardware 506 of the locality manager 222 may also transmit data to a city manager of the city layer 230, as disclosed herein.

The one or more memory modules 504 include a database 510, a section data reception module 512, a section data aggregation module 514, a locality data reception module 516, a locality level dependency database 518, a vehicle behavior learning module 520, an anomaly detection module 522, an anomaly transmission module 524, an aggregated data transmission module 526, a locality level driving rule determination module 528, and a driving rule transmission module 530. Each of the database 510, the section data reception module 512, the section data aggregation module 514, the locality data reception module 516, the locality level dependency database 518, the vehicle behavior learning module 520, the anomaly detection module 522, the anomaly transmission module 524, the aggregated data transmission module 526, the locality level driving rule determination module 528, and the driving rule transmission module 530 may be a program module in the form of operating systems, application program modules, and other program modules stored in one or more memory modules 504. In some embodiments, the program module may be stored in a remote storage device that may communicate with the locality manager 222. Such a program module may include, but is not limited to, routines, subroutines, programs, objects, components, data structures and the like for performing specific tasks or executing specific data types as will be described below.

The database 510 may temporarily store data received from one or more section managers of the section layer 210 or data received from a city manager of the city layer 230. The data received from the one or more section managers may include section data (e.g., vehicle aggregated by a section manager), as described above. The data received from a city manager of the city layer 230 may include indications that an anomaly has been detected, as disclosed in further detail below.

Referring still to FIG. 5, the section data reception module 512 may receive section data (e.g., aggregated vehicle data) from one or more section managers of the section layer 210. The section data reception module 512 may receive section data from section managers within a certain geographic area covered by the locality manager 222, as discussed above. In the example of FIG. 2, the locality manager 222 receives section data from the section managers 212 and 214. The received section data may include aggregated vehicle data received by the one or more section managers covered by the locality manager 222.

Referring still to FIG. 5, the section data aggregation module 514 may aggregate section data received from one or more section managers of the section layer 210. By aggregating section data from multiple sections in a particular locality, the locality manager 222 may obtain a more comprehensive picture of the vehicle activity within the locality. In particular, the section data aggregation module 514 may aggregate received section data to determine locality data.

The locality data reception module 516 may receive locality data from other locality managers. In the example of FIG. 2, the locality data reception module 516 of the locality manager 222 may receive locality data from the locality manager 224. This may be utilized by the locality manager 222 to determine horizontal dependencies, as disclosed herein.

The locality level dependency database 518 may store locality level dependencies, as disclosed herein. The locality level dependencies stored in the locality level dependency database 518 may be similar to section level dependencies stored in the section level dependency database 418 of the section manager 212, except that the locality level dependencies may apply to locality level data, which is typically gathered over a larger geographic area than section level data. As such, locality level data may include different variables than section level data. For example, the locality manager 222 may be able to determine traffic density in a locality, whereas a section may cover a geographic area too small to determine traffic density. Accordingly, the locality level dependency database 518 may store dependencies describing relationship between variables accessible to the locality manager 222 that are expected in driving situations in which no anomaly is present.

In some examples, the locality level dependency database 518 may store vertical dependencies between variables determined at different hierarchical levels. In other examples, the locality level dependency database 518 may store horizontal dependencies between variables determined at different locality managers (e.g., dependencies between variables determined by different locality managers of the locality layer 220).

In some examples, the dependencies in the locality level dependency database 518 may be predefined by traffic engineers. In other examples, one or more dependencies in the locality level dependency database 518 may be learned by the vehicle behavior learning module 520, as described in further detail below.

The vehicle behavior learning module 520 may learn vehicle behavior based on the section data received by the section data reception module 512. In embodiments, the vehicle behavior learning module 520 may use machine learning techniques to learn dependencies between variables based on section data received by the section data reception module 512 over time. The vehicle behavior learning module 520 may then add these learned dependencies to the locality level dependency database 518.

The anomaly detection module 522 may detect anomalies in a similar manner as the anomaly detection module 422 of the section manager 212. In particular, the anomaly detection module 522 may compare data aggregated by the section data aggregation module 514 to dependencies in the locality level dependency database 518 and determine if the aggregated data is in discord with the stored dependencies. If there is a discord between received data and one or more expected dependencies, the anomaly detection module 522 may determine that an anomaly is present. In some examples, the anomaly detection module 522 may determine discord between vertical dependencies or between horizontal dependencies.

The anomaly transmission module 524 may transmit information about an anomaly detected by the anomaly detection module 522 to a higher hierarchical level (e.g., to the city manager 232 of the city layer 230) and/or to a lower hierarchical level (e.g., to the section managers 212 and 214 of the section layer 210). The aggregated data transmission module 526 may transmit the section data aggregated by the section data aggregation module 514 to a city manager of the city layer 230 (e.g., to the city manager 232).

The locality level driving rule determination module 528 may receive information about an anomaly detected by a higher hierarchical level (e.g., from the city manager 232) and may determine a locality level rule to mitigate the effect of the anomaly. For example, the locality level driving rule determination module 528 may receive information that an anomaly is located within a particular section of the locality managed by the locality manager 222. The locality level driving rule determination module 528 may then determine a locality level rule that vehicles should avoid that particular section, or a portion thereof, thereby mitigating the effect of the anomaly.

The driving rule transmission module 530 may transmit a driving rule determined by the locality level driving rule determination module 528 to the section managers within the locality managed by the locality manager 222, which may then relay the driving rule to connected vehicles of the vehicle layer 202 within the section control by each section manager.

Figure 6:
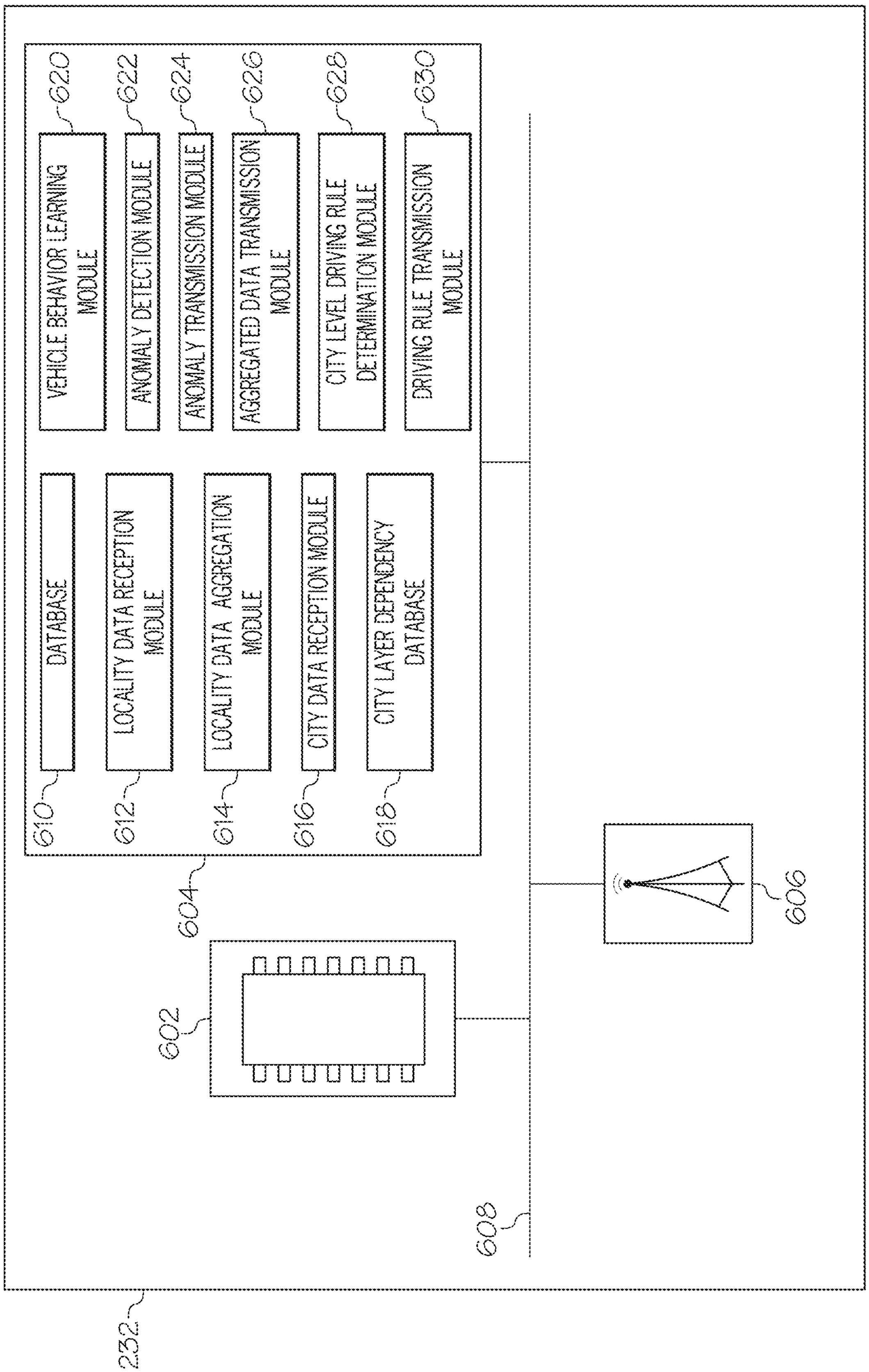
FIG. 6 schematically depicts an example city manager, according to one or more embodiments shown and described herein.

Referring now to FIG. 6, the city manager 232 of the city layer 230 of FIG. 2 is shown. While FIG. 6 specifically illustrates the city manager 232, it should be understood that any city manager of the city layer 230 may be similarly constructed.

The city manager 232 comprises one or more processors 602, one or more memory modules 604, network interface hardware 606, and a communication path 608. The one or more processors 602 may be a controller, an integrated circuit, a microchip, a computer, or any other computing device. The one or more memory modules 604 may comprise RAM, ROM, flash memories, hard drives, or any device capable of storing machine readable and executable instructions such that the machine readable and executable instructions can be accessed by the one or more processors 602. The communication path 608 provides signal interconnectivity between various modules of the city manager 232.

The network interface hardware 606 can be communicatively coupled to the communication path 608 and can be any device capable of transmitting and/or receiving data via a network. Accordingly, the network interface hardware 606 can include a communication transceiver for sending and/or receiving any wired or wireless communication. For example, the network interface hardware 606 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 606 includes hardware configured to operate in accordance with the Bluetooth® wireless communication protocol. The network interface hardware 606 of the city manager 232 may transmit and receive data to and from one or more locality managers of the locality layer 220 of FIG. 2. The network interface hardware 606 of the city manager 232 may also transmit data to the data center 240, as disclosed herein.

The one or more memory modules 604 include a database 610, a locality data reception module 612, a locality data aggregation module 614, a city data reception module 616, a city level dependency database 618, a vehicle behavior learning module 620, an anomaly detection module 622, an anomaly transmission module 624, an aggregated data transmission module 626, a city level driving rule determination module 628, and a driving rule transmission module 630. Each of the database 610, the locality data reception module 612, the locality data aggregation module 614, the city data reception module 616, the city level dependency database 618, the vehicle behavior learning module 620, the anomaly detection module 622, the anomaly transmission module 624, the aggregated data transmission module 626, the city level driving rule determination module 628, and the driving rule transmission module 630 may be a program module in the form of operating systems, application program modules, and other program modules stored in one or more memory modules 604. In some embodiments, the program module may be stored in a remote storage device that may communicate with the city manager 232. Such a program module may include, but is not limited to, routines, subroutines, programs, objects, components, data structures and the like for performing specific tasks or executing specific data types as will be described below.

The database 610 may temporarily store data received from one or more locality managers of the locality layer 220 or data received from a data center 240. The data received from the one or more locality managers may include locality data (e.g., section aggregated by a locality manager), as described above. The data received from the data center 240 may include indications that an anomaly has been detected, as disclosed in further detail below.

Referring still to FIG. 6, the locality data reception module 612 may receive locality data (e.g., aggregated section data) from one or more locality managers of the locality layer 220. The locality data reception module 612 may receive locality data from locality managers within a certain geographic area covered by the city manager 232, as discussed above. In the example of FIG. 2, the city manager 232 receives locality data from the locality manager 222. The received locality data may include aggregated section data received by the one or more locality managers covered by the city manager 232.

Referring still to FIG. 6, the locality data aggregation module 614 may aggregate locality data received from one or more locality managers of the locality layer 220. By aggregating locality data from multiple localities in a particular city, the city manager 232 may obtain a more comprehensive picture of the vehicle activity within the city. In particular, the locality data aggregation module 614 may aggregate received locality data to determine city data.

The city data reception module 616 may receive locality data from other city managers. In the example of FIG. 2, the city data reception module 616 of the city manager 232 may receive locality data from the city manager 234. This may be utilized by the city manager 232 to determine horizontal dependencies, as disclosed herein.

The city level dependency database 618 may store city level dependencies, as disclosed herein. The city level dependencies stored in the city level dependency database 618 may be similar to locality level dependencies stored in the locality level dependency database 518 of the locality manager 222, except that the city level dependencies may apply to city level data, which is typically gathered over a larger geographic area than locality level data. As such, city level data may include different variables than locality level data. Accordingly, the city level dependency database 618 may store dependencies describing relationship between variables accessible to the city manager 232 that are expected in driving situations in which no anomaly is present.

In some examples, the city level dependency database 618 may store vertical dependencies between variables determined at different hierarchical levels. In other examples, the city level dependency database 618 may store horizontal dependencies between variables determined at different city managers (e.g., dependencies between variables determined by different city managers of the city layer 230).

In some examples, the dependencies in the city level dependency database 618 may be predefined by traffic engineers. In other examples, one or more dependencies in the city level dependency database 618 may be learned by the vehicle behavior learning module 620, as described in further detail below.

The vehicle behavior learning module 620 may learn vehicle behavior based on the locality data received by the locality data reception module 612. In embodiments, the vehicle behavior learning module 620 may use machine learning techniques to learn dependencies between variables based on locality data received by the locality data reception module 612 over time. The vehicle behavior learning module 620 may then add these learned dependencies to the city level dependency database 618.

The anomaly detection module 622 may detect anomalies in a similar manner as the anomaly detection module 522 of the locality manager 222. In particular, the anomaly detection module 622 may compare data aggregated by the locality data aggregation module 614 to dependencies in the city level dependency database 618 and determine if the aggregated data is in discord with the stored dependencies. If there is a discord between received data and one or more expected dependencies, the anomaly detection module 622 may determine that an anomaly is present. In some examples, the anomaly detection module 622 may determine discord between vertical dependencies or between horizontal dependencies.

The anomaly transmission module 624 may transmit information about an anomaly detected by the anomaly detection module 622 to a higher hierarchical level (e.g., to the data center 240) and/or to a lower hierarchical level (e.g., to the locality manager 222 of the locality layer 220). The aggregated data transmission module 626 may transmit the locality data aggregated by the locality data aggregation module 614 to the data center 240.

The city level driving rule determination module 628 may receive information about an anomaly detected by a higher hierarchical level (e.g., from the data center 240) and may determine a section level rule to mitigate the effect of the anomaly. The driving rule transmission module 630 may transmit a driving rule determined by the city level driving rule determination module 628 to the locality managers within the area managed by the city manager 232.

Referring back to FIG. 2, the data center 240 may be constructed in a similar manner as the section managers of the section layer 210, the locality managers of the locality layer 220, and the city managers of the city layer 230. For example, the data center 240 may receive data from and transmit data to the city managers 232 and 234 of the city layer 230. Furthermore, it should be understood that in some examples, the traffic management system 200 may include more than or fewer than the number of hierarchical levels illustrated in the example of FIG. 2, with each hierarchical level constructed in a similar manner.

As discussed above, in some examples, the data storage component 314 of the vehicle system 300 of a connected vehicle may include a vehicle level dependency database and the memory modules 306 may include an anomaly detection module. In these examples, individual vehicles may collect sensor data and the anomaly detection module of the memory modules 306 may determine anomalies if discord is identified with one or more dependencies stored in the vehicle level dependency database. The vehicle level dependency database may store vertical dependencies and/or horizontal dependencies. If a connected vehicle identifies an anomaly, the vehicle system may display information about the determined anomaly to a driver, or update its driving behavior to avoid the anomaly in an autonomous vehicle.

Figure 8:
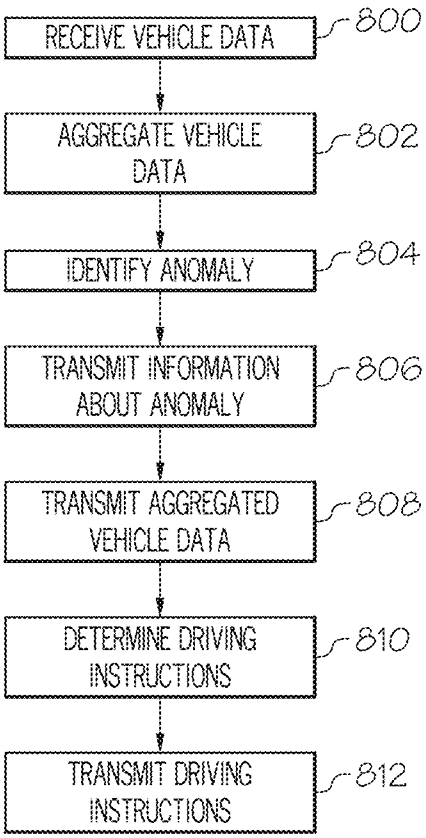
FIG. 8 depicts a flowchart for a method that may be implemented by the section manager to identify anomalies, according to one or more embodiments shown and described herein.

FIG. 8 depicts a flowchart for a method that may be implemented by the section manager 212 to detect anomalies. In particular, the method of FIG. 8 comprises a method to detect anomalies based on vertical dependencies.

At step 800, the vehicle data reception module 412 receives vehicle data from a plurality of connected vehicles of the vehicle layer 202. The received vehicle data may comprise sensor data gathered by the plurality of vehicles.

At step 802, the vehicle data aggregation module 414 aggregates the received vehicle data to determine section data. The vehicle data aggregation module 414 may also determine one or more variables based on the aggregated vehicle data. For example, the vehicle data reception module 412 may receive a speed of each of the plurality of vehicles and the vehicle data aggregation module 414 may determine an average vehicle speed of the plurality of vehicles.

At step 804, the anomaly detection module 422 determines whether the one or more variables determined by the vehicle data aggregation module 414 conform to the predetermined vertical dependencies stored in the section level dependency database 418. If there is a discord between the variables and one or more vertical dependencies in the section level dependency database 418, the anomaly detection module 422 may identify anomaly.

At step 806, the anomaly transmission module 424 transmits information about the identified anomaly to the locality manager 222 and to the vehicles of the vehicle layer 202. At step 808, the aggregated data transmission module 426 transmits the aggregated vehicle data and the one or more variables determined by the vehicle data aggregation module 414 to the locality manager 222.

At step 810, the section level driving rule determination module 428 determines a driving rule based on the identified anomaly. The determined driving rule may cause the vehicles of the vehicle layer 202 to avoid the anomaly or otherwise mitigate the effects of the anomaly. Then, at step 812, the driving rule transmission module 430 transmits the determined driving rule to the vehicles of the vehicle layer 202.

Figure 9:
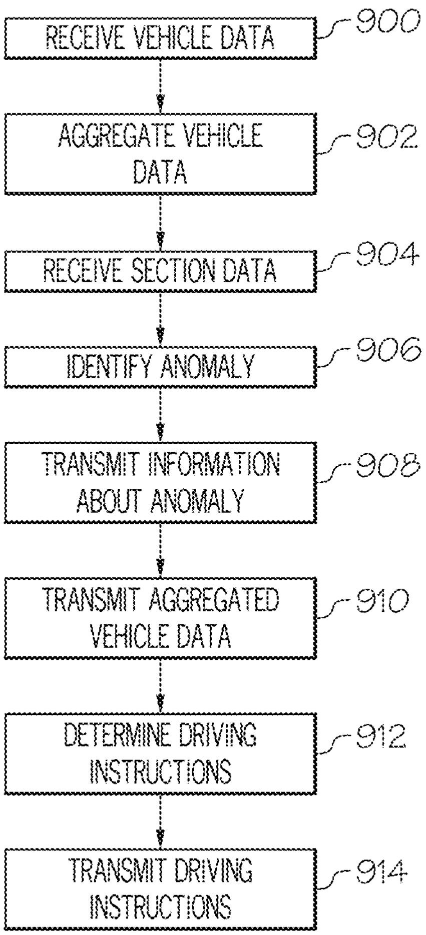
FIG. 9 depicts a flowchart for another method that may be implemented by the section manager to identify anomalies, according to one or more embodiments shown and described herein.

FIG. 9 depicts a flowchart for another method that may be implemented by the section manager 212 to detect anomalies. In particular, the method of FIG. 9 comprises a method to detect anomalies based on horizontal dependencies.

At step 900, the vehicle data reception module 412 receives vehicle data from a plurality of connected vehicles of the vehicle layer 202. The received vehicle data may comprise sensor data gathered by the plurality of vehicles.

At step 902, the vehicle data aggregation module 414 aggregates the received vehicle data to determine section data. The vehicle data aggregation module 414 may also determine one or more variables based on the aggregated vehicle data.

At step 904, the section data reception module 416 receives section data from another section manager (e.g., the section manager 214). At step 906, the anomaly detection module 422 determines whether the one or more variables determined by the vehicle data aggregation module 414 and one or more variables associated with the section data received by the section data reception module 416 conform to the predetermined horizontal dependencies stored in the section level dependency database 418. If there is a discord between the variables and one or more horizontal dependencies in the section level dependency database 418, the anomaly detection module 422 may identify anomaly.

At step 908, the anomaly transmission module 424 transmits information about the identified anomaly to the locality manager 222 and to the vehicles of the vehicle layer 202. At step 910, the aggregated data transmission module 426 transmits the aggregated vehicle data and the one or more variables determined by the vehicle data aggregation module 414 to the locality manager 222.

At step 912, the section level driving rule determination module 428 determines a driving rule based on the identified anomaly. The determined driving rule may cause the vehicles of the vehicle layer 202 to avoid the anomaly or otherwise mitigate the effects of the anomaly. Then, at step 914, the driving rule transmission module 430 transmits the determined driving rule to the vehicles of the vehicle layer 202.

Figure 10:
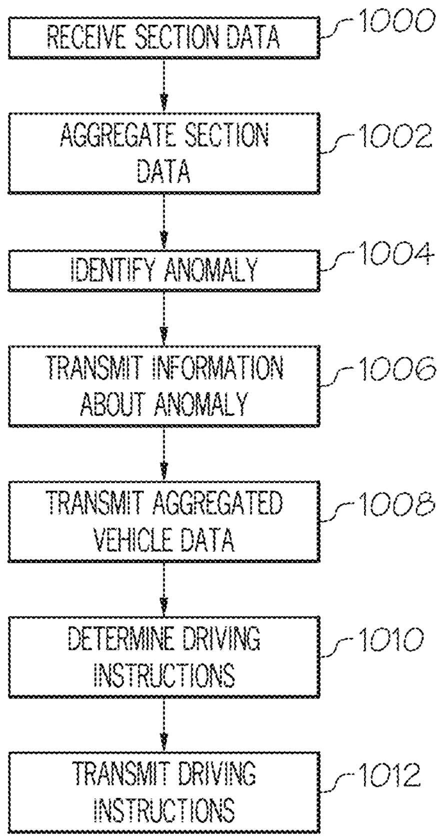
FIG. 10 depicts a flowchart for a method that may be implemented by the locality manager to identify anomalies, according to one or more embodiments shown and described herein.

FIG. 10 depicts a flowchart for a method that may be implemented by the locality manager 222 to detect anomalies. In particular, the method of FIG. 10 comprises a method to detect anomalies based on vertical dependencies.

At step 1000, the section data reception module 512 receives section data from one or more section managers of the section layer 210. The section data reception module 512 may also receive one or more variables determined by the one or more section managers based on the section data. In the example of FIG. 2, the section data reception module 512 of the locality manager 222 receives section data from the section managers 212 and 214. The received section data may be vehicle data aggregated by the one or more section managers.

At step 1002, the section data aggregation module 514 aggregates the received section data to determine locality data. The section data aggregation module 514 may also determine one or more variables based on the aggregated section data.

At step 1004, the anomaly detection module 522 determines whether the one or more variables determined by the section data aggregation module 514 and the one or more variables received by the section data reception module 512 conform to the predetermined vertical dependencies stored in the locality level dependency database 518. If there is a discord between the variables and one or more vertical dependencies in the locality level dependency database 518, the anomaly detection module 522 may identify an anomaly.

At step 1006, the anomaly transmission module 524 transmits information about the identified anomaly to the city manager 232 and to the section manager 212. At step 1008, the aggregated data transmission module 526 transmits the aggregated section data and the one or more variables determined by the section data aggregation module 514 to the city manager 232.

At step 1010, the locality level driving rule determination module 528 determines a driving rule based on the identified anomaly. Then, at step 1012, the driving rule transmission module 530 transmits the determined driving rule to the one or more section managers associated with the locality manager 222. After receiving the driving rule from the driving rule transmission module 530 of the locality manager 222, the section managers may relay the driving rule to connected vehicles within the geographic area managed by the section manager.

Figure 11:
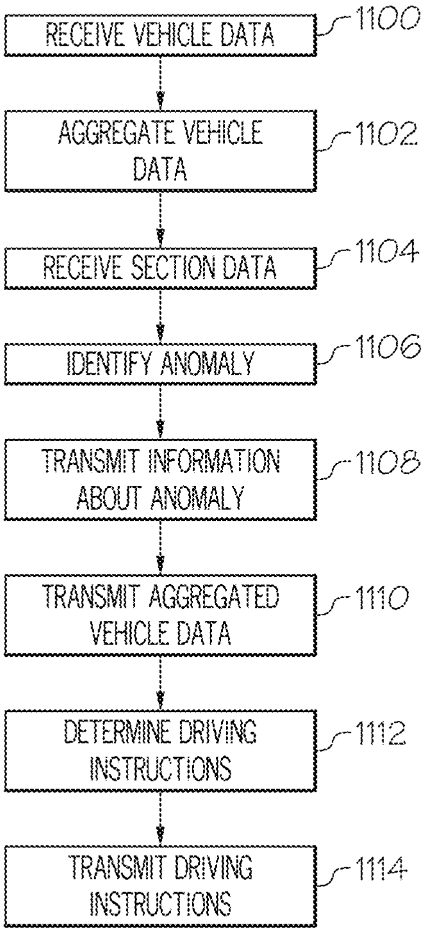
FIG. 11 depicts a flowchart for another method that may be implemented by the locality manger to identify anomalies, according to one or more embodiments shown and described herein.

FIG. 11 depicts a flowchart for another method that may be implemented by the locality manager 222 to detect anomalies. In particular, the method of FIG. 11 comprises a method to detect anomalies based on horizontal dependencies.

At step 1100, the section data reception module 512 receives section data from one or more section managers of the section layer 210. At step 1102, the section data aggregation module 514 aggregates the received section data to determine locality data. The section data aggregation module 514 may also determine one or more variables based on the aggregated section data.

At step 1104, the locality data reception module 516 receives locality data from another locality manager (e.g., the locality manager 224). At step 1106, the anomaly detection module 522 determines whether the one or more variables determined by the section data aggregation module 514 and one or more variables associated with the locality data received by the locality data reception module 516 conform to the predetermined horizontal dependencies stored in the locality level dependency database 518. If there is a discord between the variables and one or more horizontal dependencies in the locality level dependency database 518, the anomaly detection module 522 may identify anomaly.

At step 1108, the anomaly transmission module 524 transmits information about the identified anomaly to the city manager 232 and to the section managers associated with the locality manager 222 (e.g., the section managers 212 and 214). At step 1110, the aggregated data transmission module 526 transmits the aggregated locality data and the one or more variables determined by the section data aggregation module 514 to the city manager 232.

At step 1112, the locality level driving rule determination module 528 determines a driving rule based on the identified anomaly. Then, at step 1114, the driving rule transmission module 530 transmits the determined driving rule to the one or more section managers associated with the locality manager 222. After receiving the driving rule from the driving rule transmission module 530 of the locality manager 222, the section managers may relay the driving rule to connected vehicles within the geographic area managed by the section manager.

Figure 12:
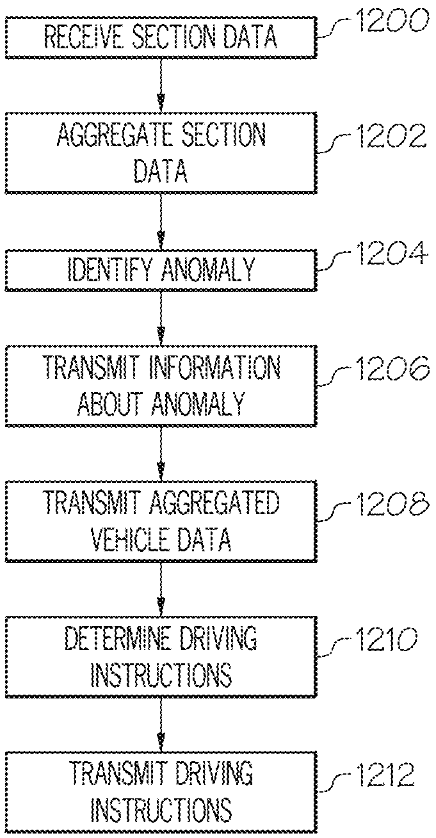
FIG. 12 depicts a flowchart for a method that may be implemented by the city manager to identify anomalies, according to one or more embodiments shown and described herein.

FIG. 12 depicts a flowchart for a method that may be implemented by the city manager 232 to detect anomalies. In particular, the method of FIG. 12 comprises a method to detect anomalies based on vertical dependencies.

At step 1200, the locality data reception module 612 receives locality data from one or more locality managers of the locality layer 220. The locality data reception module 612 may also receive one or more variables determined by the one or more locality managers based on the locality data. In the example of FIG. 2, the locality data reception module 612 of the city manager 232 receives locality data from the locality manager 222. The received locality data may be section data aggregated by the one or more locality managers.

At step 1202, the locality data aggregation module 614 aggregates the received locality data to determine city data. The locality data aggregation module 614 may also determine one or more variables based on the aggregated locality data.

At step 1204, the anomaly detection module 622 determines whether the one or more variables determined by the locality data aggregation module 614 and the one or more variables received by the locality data reception module 612 conform to the predetermined vertical dependencies stored in the city level dependency database 618. If there is a discord between the variables and one or more vertical dependencies in the city level dependency database 618, the anomaly detection module 622 may identify an anomaly.

At step 1206, the anomaly transmission module 624 transmits information about the identified anomaly to the data center 240 and to the locality manager 222. At step 1208, the aggregated data transmission module 626 transmits the aggregated locality data and the one or more variables determined by the locality data aggregation module 614 to the data center 240.

At step 1210, the city level driving rule determination module 628 determines a driving rule based on the identified anomaly. Then, at step 1212, the driving rule transmission module 630 transmits the determined driving rule to the one or more locality managers associated with the city manager 232. After receiving the driving rule from the driving rule transmission module 630 of the city manager 232, the one or more locality managers may relay the driving rule to section managers associated with each locality manager, and each section manager may relay the driving rule to connected vehicles within the geographic area managed by the section manager.

Figure 13:
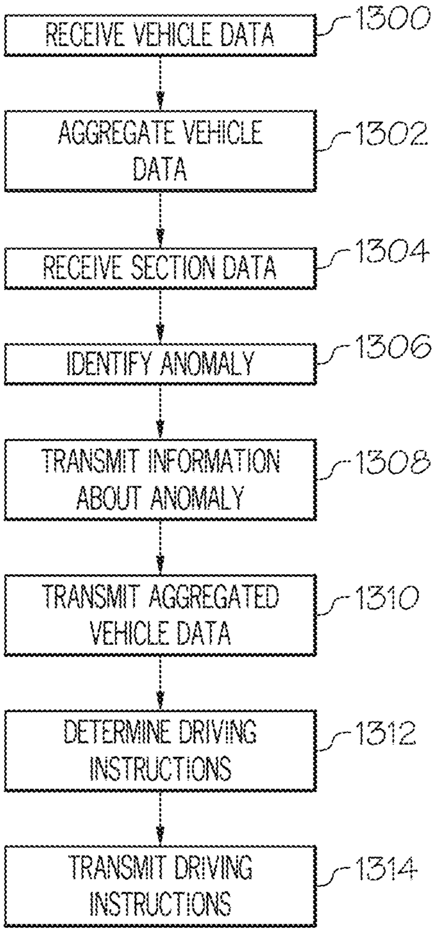
FIG. 13 depicts a flowchart for another method that may be implemented by the city manager to identify anomalies, according to one or more embodiments shown and described herein.

FIG. 13 depicts a flowchart for another method that may be implemented by the city manager 232 to detect anomalies. In particular, the method of FIG. 13 comprises a method to detect anomalies based on horizontal dependencies.

At step 1300, the locality data reception module 612 receives locality data from one or more locality managers of the locality layer 220. At step 1302, the locality data aggregation module 614 aggregates the received locality data to determine city data. The locality data aggregation module 614 may also determine one or more variables based on the aggregated locality data.

At step 1304, the city data reception module 616 receives city data from another city manager (e.g., the city manager 234). At step 1306, the anomaly detection module 622 determines whether the one or more variables determined by the locality data aggregation module 614 and one or more variables associated with the city data received by the city data reception module 616 conform to the predetermined horizontal dependencies stored in the city level dependency database 618. If there is a discord between the variables and one or more horizontal dependencies in the city level dependency database 618, the anomaly detection module 622 may identify anomaly.

At step 1308, the anomaly transmission module 624 transmits information about the identified anomaly to the data center 240 and to the locality managers associated with the city manager 232 (e.g., the locality manager 222). At step 1310, the aggregated data transmission module 626 transmits the aggregated city data and the one or more variables determined by the locality data aggregation module 614 to the data center 240.

At step 1312, the city level driving rule determination module 628 determines a driving rule based on the identified anomaly. Then, at step 1314, the driving rule transmission module 630 transmits the determined driving rule to the one or more locality managers associated with the city manager 232. After receiving the driving rule from the driving rule transmission module 630 of the city manager 232, the locality managers may relay the driving rule to each of the section managers associated with the locality manager, and the section managers may relay the driving rule to connected vehicles within the geographic area managed by the section manager.

Figure 14:
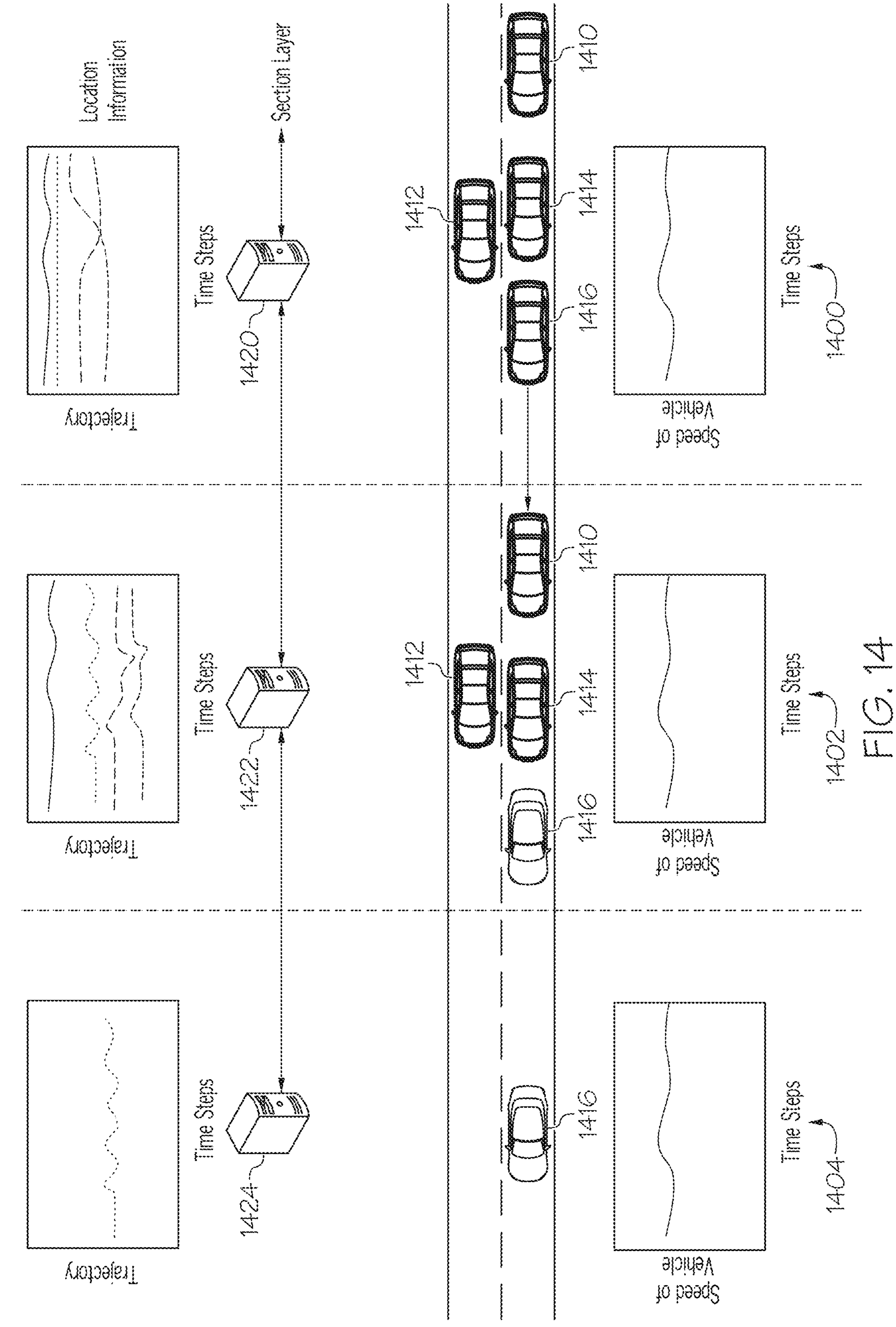
FIG. 14 depicts example data that may be used to identify anomalies, according to one or more embodiments shown and described herein.
Figure 15:
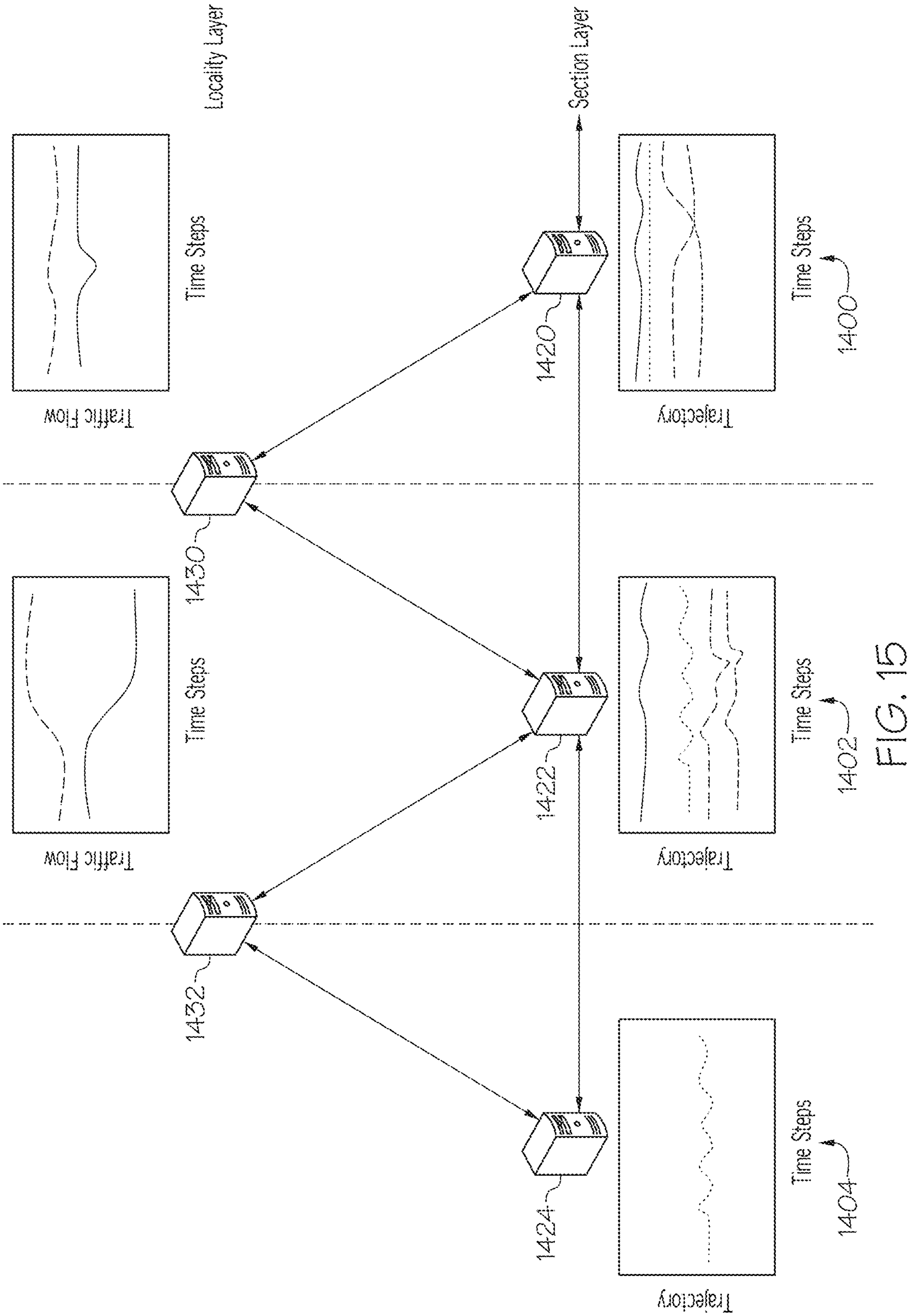
FIG. 15 depicts additional example data that may be used to identify anomalies, according to one or more embodiments shown and described herein.
Figure 16:
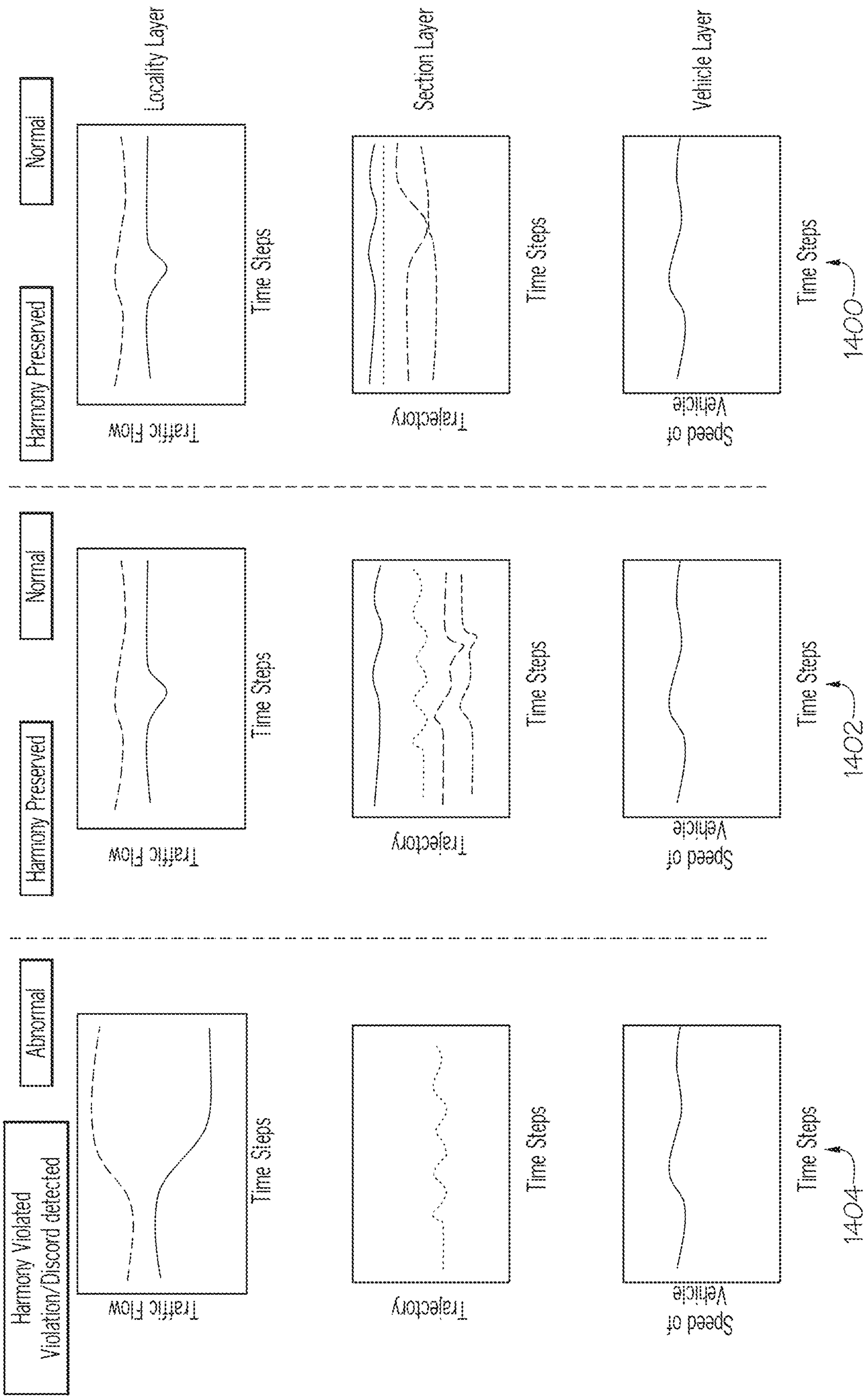
FIG. 16 depicts additional example data that may be used to identify anomalies, according to one or more embodiments shown and described herein.

An example operation of the traffic management system 200 is shown in FIGS. 14, 15 and 16. In the example of FIGS. 14, 15, and 16, vehicles 1410, 1412, 1414, and 1416 drive along a road, as shown in FIG. 14. Speeds of the vehicles is measured at a vehicle layer trajectories of the vehicles is measured at a section layer, and traffic flow is measured at a locality layer.

At a first time step 1400, a section manager 1420 receives vehicle data from vehicles 1410, 1412, 1414, and 1416. All four vehicles 1410, 1412, 1414, and 1416 have similar vehicle speeds and similar vehicle trajectories. At a second time step 1402, a section manager 1422 receives vehicle data from vehicles 1410, 1412, 1414, and 1416. The vehicles still have similar speeds, however vehicle 1416, which is a drunk or aggressive driver, starts zig-zagging along an unsteady trajectory. However, vehicles 1410, 1412, and 1414 also start zig-zagging to avoid a collision with vehicle 1416. Thus, the trajectories of all the vehicles follow the pattern of the trajectory of vehicle 1416. Finally, at a third time step 1404, a section manager 1424 receives vehicle data from vehicle 1416. Vehicle 1416 is driving alone as vehicles 1410, 1412, and 1414 have changed lanes in order to avoid the vehicle 1416.

FIG. 14 shows that at time step 1404, a single trajectory is measured as compared to time steps 1400 and 1402, where four trajectories were measured.

FIG. 15 shows that a locality manager 1430 receives section data from the section managers 1420 and 1422, and a locality manager 1432 receives section data from the section manager 1422 and 1424. The locality managers 1430 and 1432 may aggregate trajectory data from corresponding section managers and determine traffic flow data based on the aggregated trajectory data.

FIGS. 15 and 16 show that the traffic flow in one lane is reduced at time step 1404. Thus, in the example of FIGS. 14, 15 and 16, a dependency is violated since variables of vehicles speeds, trajectories, and traffic flow do not conform to a predetermined dependency among the variables. Specifically, in this example, traffic flow changes while vehicles speeds and trajectories are relatively constant while a predetermined dependency indicates that traffic flow should remain stable when vehicle speeds and trajectories are constant. As such, an anomaly may be detected.

In embodiments, the locality manager 1432 may determine that an anomaly is detected in a section managed by the section manager 1424, and may inform the section manager 1424 of the anomaly. The section manager 1424 may then determine that the vehicle 1416 is the vehicle causing the anomaly. Then, the section manager 1424 may transmit information about the anomaly of vehicle 1416 to other section managers which may cover sections where the vehicle 1416 is expected to pass through. In addition, the section manager 1424 may transmit information about the anomaly of vehicle 1416 to vehicles in the section managed by the section manager 1424 and/or transmit driving instructions to the vehicles in the section managed by the section manager 1424.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

at a first computing device associated with a first geographic area:

receiving vehicle data from a first plurality of vehicles in the first geographic area;

aggregating the vehicle data to generate first aggregated vehicle data;

determining a first variable associated with the first plurality of vehicles based on the first aggregated vehicle data; and transmitting the first aggregated vehicle data and the first variable to a second computing device associated with a second geographic area larger than, and encompassing, the first geographic area, the second computing device being in a higher hierarchical level than the first computing device;

at the second computing device:

receiving the first aggregated vehicle data and the first variable from the first computing device;

receiving second aggregated vehicle data from a third computing device associated with a third geographic area, the third geographic area being different than the first geographic area and the second geographic area, the second geographic area encompassing the third geographic area;

determining a second variable associated with a second plurality of vehicles in the second geographic area based on the first aggregated vehicle data and the second aggregated vehicle data;

determining whether the first and second variables conform to a predetermined dependency among the variables; and identifying an anomaly based on the determination; and at a vehicle, receiving information about the identified anomaly and updating driving behavior of the vehicle to autonomously navigate the vehicle to avoid the anomaly.

2. The method of claim 1, wherein the predetermined dependency among the variables comprises an expected relationship between the variables when the anomaly is not present.

3. The method of claim 1, wherein the predetermined dependency among the variables is determined by a traffic engineer.

4. The method of claim 1, further comprising using machine learning techniques to determine the predetermined dependency among the variables based on previously received vehicle data.

5. The method of claim 1, further comprising, at the first computing device, determining a driving rule based on the identified anomaly and transmitting the driving rule to one or more of first the plurality of vehicles.

6. A system comprising:

a first computing device associated with a first geographic area;

a second computing device associated with a second geographic area larger than, and encompassing, the first geographic area, the second computing device being in a higher hierarchical level than the first computing device; and a third computing device associated with a third geographic area, the third geographic area being different than the first geographic area and the second geographic area, the second geographic area encompassing the third geographic area;

wherein the first computing device is configured to:

receive vehicle data from a first plurality of vehicles in the first geographic area;

aggregate the vehicle data to generate first aggregated vehicle data;

determine a first variable associated with the first plurality of vehicles based on the first aggregated vehicle data; and transmit the first aggregated vehicle data and the first variable to the second computing device; and wherein the second computing device is configured to:

receive the first aggregated vehicle data and the first variable from the first computing device;

receive second aggregated vehicle data from the third computing device;

determine a second variable associated with a second plurality of vehicles in the second geographic area based on the first aggregated vehicle data and the second aggregated vehicle data;

determine whether the first variable and the second variable conform to a predetermined dependency among the variables;

identify an anomaly based on the determination; and update driving behavior of a vehicle to autonomously navigate the vehicle to avoid the anomaly.

7. The system of claim 6, wherein at least one of the first computing device, the second computing device, and the third computing device is configured to use machine learning techniques to determine the predetermined dependency among the variables based on previously received vehicle data.

8. The system of claim 6, wherein the second computing device is configured to use machine learning techniques to determine the predetermined dependency among the variables based on previously received aggregated data.

9. The system of claim 6, wherein:

the first computing device is configured to transmit the first variable to the third computing device; and the third computing device is configured to:

receive the first variable from the first computing device;

determine whether the first variable received from the first computing device and a second variable determined by the third computing device conform to a predetermined dependency among the variables; and identify an anomaly based on the determination.

10. The system of claim 6, wherein the second computing device is configured to:

determine a driving rule based on the identified anomaly; and transmit the driving rule to the first computing device and the third computing device.

11. The system of claim 10, wherein the first computing device is configured to:

receive the driving rule from the second computing device; and transmit the received driving rule to each of the first plurality of vehicles.

12. The system of claim 6, wherein:

the second computing device is configured to:

determine a geographic area in which the anomaly is located;

determine which one of the first computing device and the third computing device is associated with the determined geographic area; and transmit information about the identified anomaly to the determined one of the first computing device and the third computing device; and the first computing device is configured to:

receive the information about the identified anomaly;

determine a driving rule based on the received information about the identified anomaly; and transmit the determined driving rule to each of the first plurality of vehicles.

13. The system of claim 6, further comprising:

a fourth computing device being in a higher hierarchical level than the second computing device, wherein:

the second computing device is configured to:

transmit the second aggregated vehicle data and the second variable to the fourth computing device; and the fourth computing device is configured to:

aggregate the second aggregated vehicle data received from the second computing device to determine third aggregated vehicle data;

determine a third variable associated with a third plurality of vehicles based on the third aggregated vehicle data;

determine whether the first variable, the second variable, and the third variable conform to a predetermined dependency among the variables; and identify an anomaly based on the determination.

14. The system of claim 13, wherein:

the fourth computing device is configured to:

determine a driving rule based on the identified anomaly; and transmit the driving rule to the second computing device;

the second computing device is configured to:

receive the determined driving rule from the fourth computing device; and transmit the received driving rule to the first computing device and the third computing device; and the first computing device is configured to:

receive the driving rule from the second computing device; and transmit the driving rule to each of the third plurality of vehicles.

15. The system of claim 13, wherein:

the fourth computing device is configured to:

determine a geographic area in which the anomaly is located;

identify a computing device associated with the determined geographic area; and transmit information about the identified anomaly to the identified computing device;

the second computing device is configured to:

receive the information about the identified anomaly;

determine which of the first computing device and the third computing device is associated with the geographic area in which the anomaly is located; and transmit the information about the anomaly to the determined one of the first computing device and the third computing device; and the first computing device is configured to:

receive the information about the identified anomaly; and transmit the information about the identified anomaly to each of the third plurality of vehicles.

* * * * *